United States Patent
Kong et al.

(10) Patent No.: US 9,436,447 B2
(45) Date of Patent: Sep. 6, 2016

(54) TECHNIQUE FOR LIVE ANALYSIS-BASED REMATERIALIZATION TO REDUCE REGISTER PRESSURES AND ENHANCE PARALLELISM

(71) Applicant: NVIDIA Corporation, Santa Clara, CA (US)

(72) Inventors: Xiangyun Kong, Union City, CA (US); Jian-Zhong Wang, Fremont, CA (US); Yuan Lin, Cupertino, CA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 336 days.

(21) Appl. No.: 13/669,401

(22) Filed: Nov. 5, 2012

(65) Prior Publication Data

US 2013/0117734 A1 May 9, 2013

Related U.S. Application Data

(60) Provisional application No. 61/556,782, filed on Nov. 7, 2011.

(51) Int. Cl.
*G06F 9/45* (2006.01)
*G06F 9/50* (2006.01)

(52) U.S. Cl.
CPC .......... *G06F 8/443* (2013.01); *G06F 8/41* (2013.01); *G06F 8/433* (2013.01); *G06F 8/45* (2013.01); *G06F 8/456* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 4,449,196 A | 5/1984 | Pritchard | |
| 6,286,135 B1 | 9/2001 | Santhanam | |
| 6,415,311 B1 | 7/2002 | Purcell et al. | |
| 6,523,173 B1 * | 2/2003 | Prosser et al. | 717/152 |
| 2002/0144097 A1 | 10/2002 | Kawahito et al. | |
| 2004/0006681 A1 | 1/2004 | Moreno et al. | |

(Continued)

FOREIGN PATENT DOCUMENTS

| | | |
|---|---|---|
| TW | 548587 B | 8/2003 |
| TW | 201029401 A | 8/2010 |
| TW | 201106148 A | 2/2011 |

OTHER PUBLICATIONS

Cindy Norris, "An Experimental Study of Several Cooperative Register Allocation and Instruction Scheduling Strategies", 1995, 1072-4451/95 IEEE, MICRO-28.*

(Continued)

*Primary Examiner* — Lewis A Bullock, Jr.
*Assistant Examiner* — Wynuel Aquino
(74) *Attorney, Agent, or Firm* — Artegis Law Group, LLP (57) ABSTRACT

A device compiler and linker within a parallel processing unit (PPU) is configured to optimize program code of a co-processor enabled application by rematerializing a subset of live-in variables for a particular block in a control flow graph generated for that program code. The device compiler and linker identifies the block of the control flow graph that has the greatest number of live-in variables, then selects a subset of the live-in variables associated with the identified block for which rematerializing confers the greatest estimated profitability. The profitability of rematerializing a given subset of live-in variables is determined based on the number of live-in variables reduced, the cost of rematerialization, and the potential risk of rematerialization.

18 Claims, 6 Drawing Sheets

(56) References Cited

U.S. PATENT DOCUMENTS

| | | |
|---|---|---|
| 2004/0078789 A1 | 4/2004 | Ghiya et al. |
| 2004/0221283 A1 | 11/2004 | Worley |
| 2005/0108499 A1 | 5/2005 | Huang et al. |
| 2005/0203928 A1 | 9/2005 | Sankaran |
| 2007/0124631 A1 | 5/2007 | Boggs et al. |
| 2008/0235674 A1 | 9/2008 | Gao et al. |
| 2009/0070753 A1 | 3/2009 | Chen et al. |
| 2009/0125893 A1* | 5/2009 | Copeland et al. ............ 717/151 |
| 2010/0153654 A1 | 6/2010 | Vorbach et al. |
| 2010/0199270 A1* | 8/2010 | Baev ............................ 717/157 |
| 2011/0161977 A1 | 6/2011 | Vorbach |
| 2011/0225573 A1 | 9/2011 | Zaafrani |

OTHER PUBLICATIONS

Leonidas Fegaras, "Liveness Analysis and Register Allocation", 2001, uta.edu.*

Ivan D. Baev, "Techniques for Region-Based Register Allocation", 2009, IEEE.*

International Search Report and Written Opinion for PCT/US2012/063757 dated Jan. 22, 2013.

International Search Report and Written Opinion for PCT/US2012/063754 dated Jan. 22, 2013.

International Search Report and Written Opinion for PCT/US2012/063756 dated Jan. 22, 2013.

* cited by examiner

TECHNIQUE FOR LIVE ANALYSIS-BASED REMATERIALIZATION TO REDUCE REGISTER PRESSURES AND ENHANCE PARALLELISM

CROSS-REFERENCE TO RELATED APPLICATIONS

This application claims the benefit of United States provisional patent application titled "Method for Live-Analysis Based Rematerialization to Reduce Register Pressures and Enhance Parallelism" filed on Nov. 7, 2011 and having Ser. No. 61/556,782. The entire content of the foregoing application is hereby incorporated herein by reference.

BACKGROUND OF THE INVENTION

1. Field of the Invention

The present invention generally relates to compilers for parallel processing units (PPUs), and, more specifically, to a technique for live analysis-based rematerialization to reduce register pressures and enhance parallelism.

2. Description of the Related Art

Graphics processing units (GPUs) have evolved over time to support a wide range of operations beyond graphics-oriented operations. In fact, a modern GPU may be capable of executing arbitrary program instructions. Such a GPU typically includes a compiler that compiles program instructions for execution on one or more processing cores included within the GPU. Each such core may execute one or more different execution threads in parallel with other processing cores executing execution threads.

When a processing core within the GPU executes a set of program instructions, the processing core may store program variables associated with those instructions in register memory. When register memory is entirely consumed by program variables, additional program variables may "spill" into system memory, as is known in the art. One problem with the conventional approach to "spilling" is that system memory has a much higher latency than register memory. Consequently, the speed with which the program instructions execute may decrease dramatically after a "spill" event occurs because the program variables have to be accessed from system memory instead of register memory. A second problem is that the number of threads a given processing core is capable of executing simultaneously within a processing unit depends on the available register memory. Thus, filling up register memory with program variables may end up decreasing the number of simultaneously executing threads and, consequently, overall processing throughput of the GPU.

Accordingly, what is needed in the art is a more effective technique for managing register memory within a GPU.

SUMMARY OF THE INVENTION

One embodiment of the present inventions sets forth a computer-implemented method for optimizing program code that is capable of being compiled for execution on a parallel processing unit (PPU), including generating a control flow graph for the program code, identifying a first block in the control flow graph with the greatest number of live-in variables compared to other blocks in the control flow graph, selecting a first subset of live-in variables associated with the first block by performing a profitability analysis on different subsets of live-in variables associated with the first block, and optimizing the program code by rematerializing the first subset of live-in variables into a second block in the control flow graph that is subsequent to the first block in the control flow graph, where the optimized program code is to be executed on the PPU.

One advantage of the disclosed technique is that rematerializing certain subsets of live-in variables decreases register pressure, thereby reducing the likelihood of a spill event. Decreasing register pressure also allows a greater number of execution threads to be executed simultaneously within a PPU, thereby increasing the overall processing throughput of the PPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
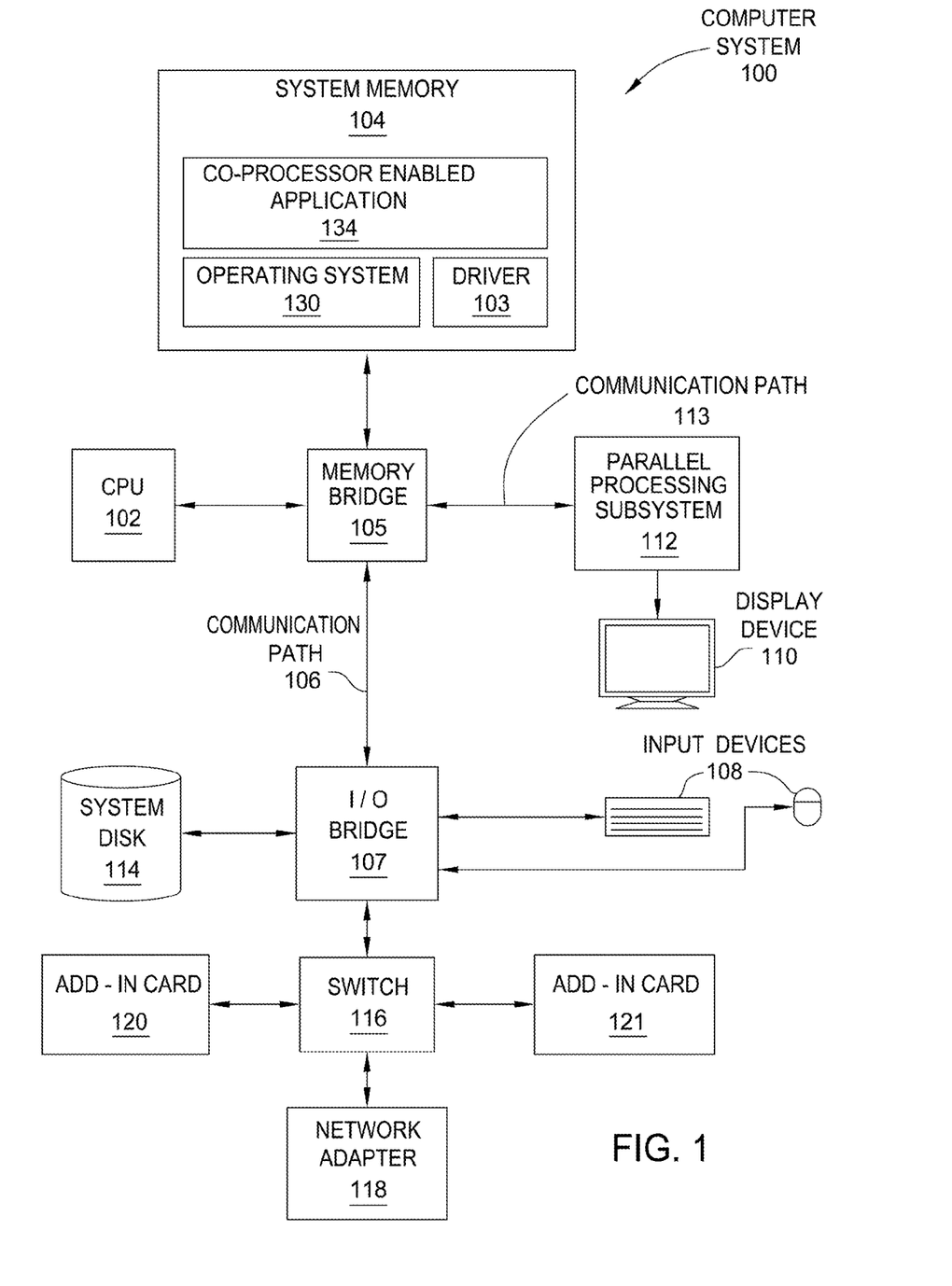
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. System memory 104 includes an image of an operating system 130, a driver 103, and a co-processor enabled application 134. Operating system 130 provides detailed instructions for managing and coordinating the operation of computer system 100. Driver 103 provides detailed instructions for managing and coordinating operation of parallel processing subsystem 112 and one or more parallel processing units (PPUs) residing therein, as described in greater detail below in conjunction with FIG. 2. Driver 103 also provides compilation facilities for generating machine code specifically optimized for such PPUs, as described in greater detail below in conjunction with FIGS. 3-6. Co-processor enabled application 134 incorporates instructions capable of being executed on the CPU 102 and PPUs, those instructions being implemented in an abstract format, such as virtual assembly, and mapping to machine code for the PPUs within parallel processing subsystem 112. The machine code for those PPUs may be stored in system memory 104 or in memory coupled to the PPUs.

In one embodiment, co-processor enabled application 134 represents CUDA™ code that incorporates programming instructions intended to execute on parallel processing subsystem 112. In the context of the present description, the term "application" or "program" refers to any computer code, instructions, and/or functions that may be executed using a processor. For example, in various embodiments, co-processor enabled application 134 may include C code, C++ code, etc. In one embodiment, co-processor enabled application 134 may include a language extension of a computer language (e.g., C, C++, etc.).

Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. Parallel processing subsystem 112 is coupled to memory bridge 105 via a bus or second communication path 113 (e.g., a Peripheral Component Interconnect Express (PCIe), Accelerated Graphics Port (AGP), or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and compact disc (CD) read-only memory (ROM), digital video disc (DVD) ROM, Blu-ray, high-definition (HD) DVD, or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, CD drives, DVD drives, film recording devices, and the like, may also be connected to I/O bridge 107. The various communication paths shown in FIG. 1, including the specifically named communication paths 106 and 113 may be implemented using any suitable protocols, such as PCIe, AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
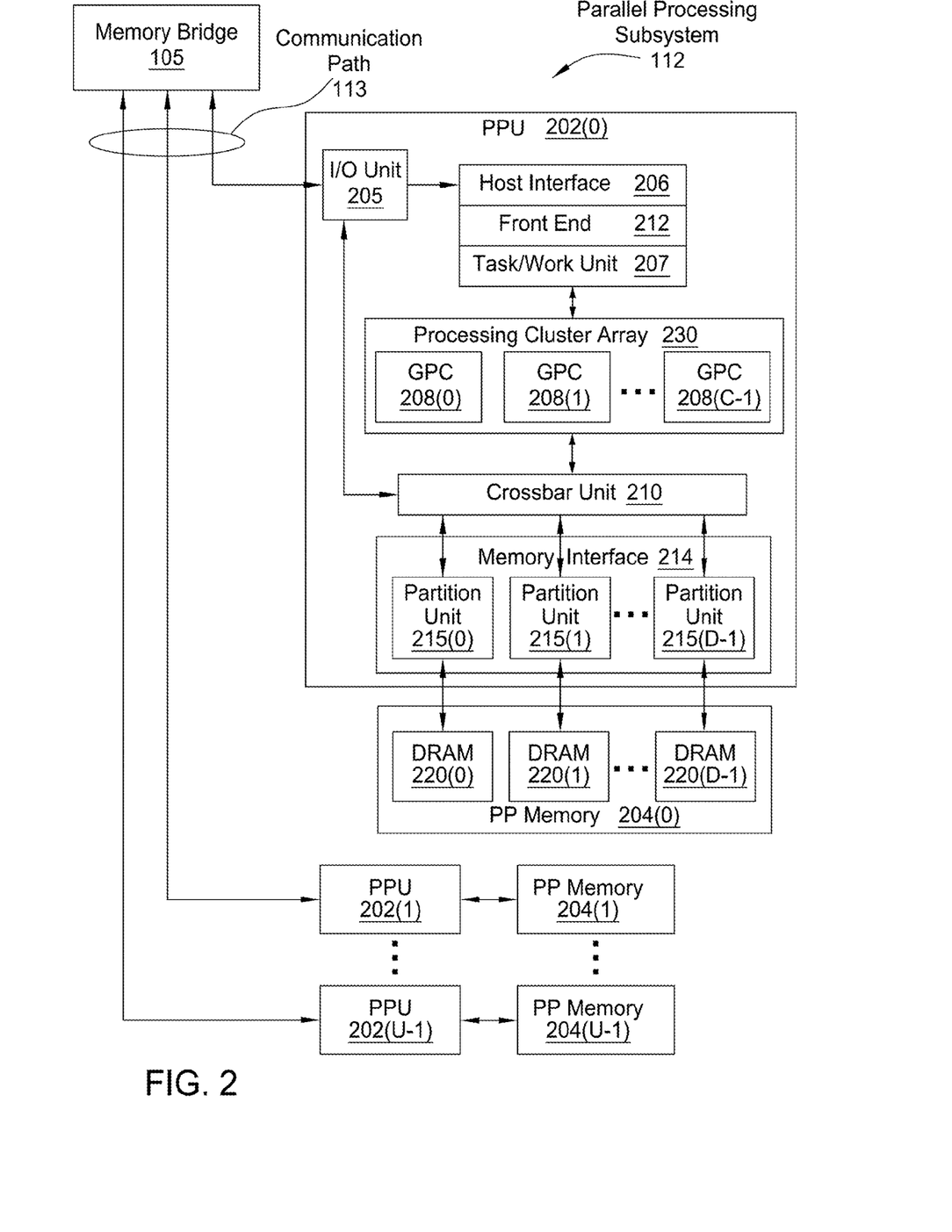
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U is greater than or equal to 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring to FIGS. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. PPU 202 reads command streams from one or more pushbuffers and then executes commands asynchronously relative to the operation of CPU 102. Execution priorities may be specified for each pushbuffer by an application program via device driver 103 to control scheduling of the different pushbuffers.

Each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, as mentioned above, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means. Alternatively, each PPU 202 may be implemented with a non-uniform memory architecture, and each such PPU 202 may have access to multiple different memory spaces as directed by co-processor enabled application 134.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

As mentioned above, each PPU 202 is configured to execute co-processor enabled application 134 shown in FIG. 1. Co-processor enabled application 134 is compiled by a device compiler and linker application that is derived from device driver 103, as described in greater detail below in conjunction with FIG. 3.

Figure 3:
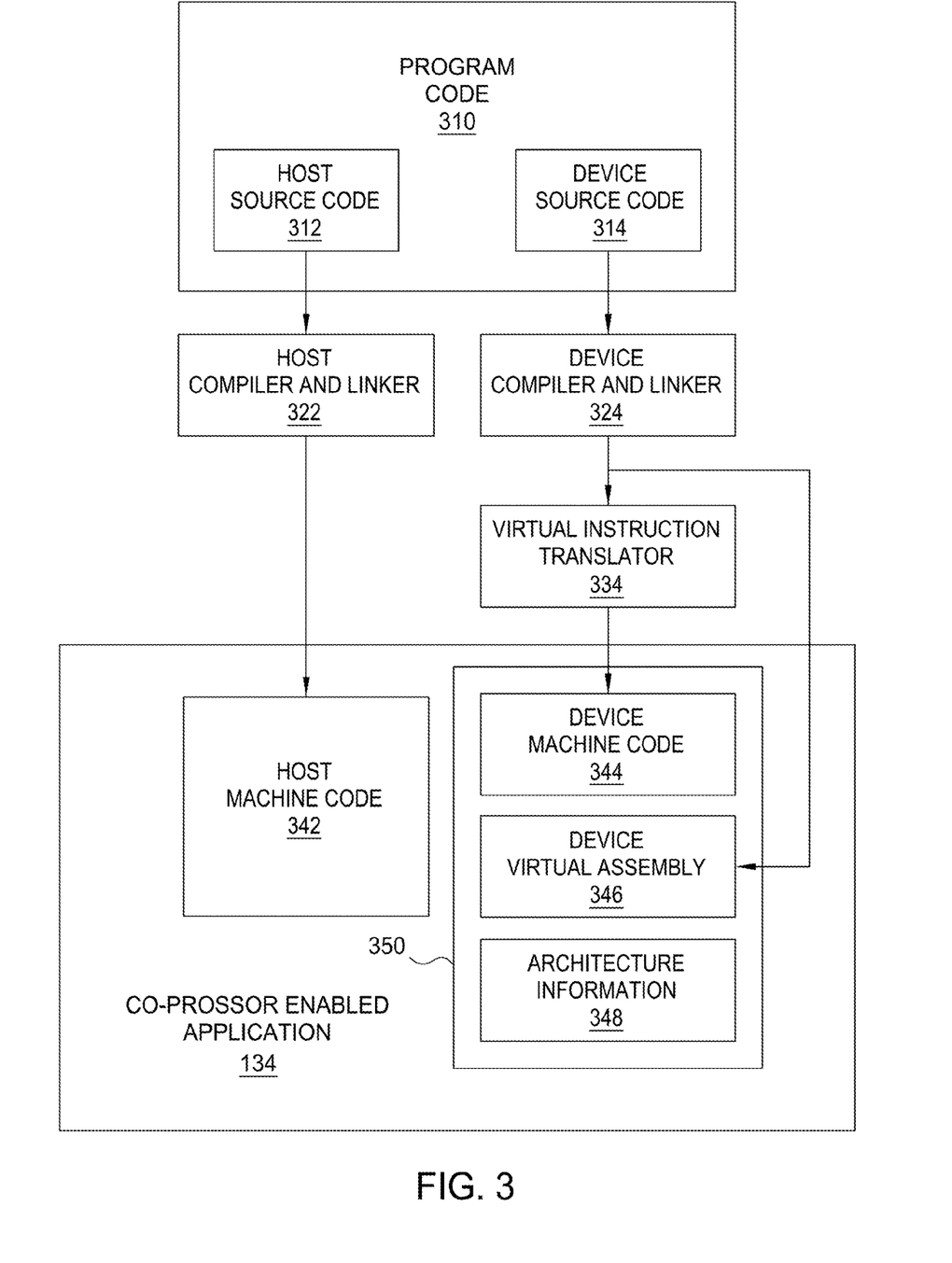
FIG. 3 illustrates a build process used to compile a co-processor enabled application, according to one embodiment of the present invention.

FIG. 3 illustrates the build process used to compile the co-processor enabled application 134 of FIG. 1, according to one embodiment of the present invention. Program code 310 includes host source code 312 and device source code 314. Host source code 312 incorporates programming instructions intended to execute on a host, such as an x86-based personal computer (PC) or server. The programming instructions in source code 312 may include calls to functions defined in device source code 314. Any technically feasible mechanism may be used to specify which functions are designated as device source code 314.

Host source code 312 is pre-processed, compiled, and linked by a host compiler and linker 322. The host compiler and linker 322 generates host machine code 342, which is stored within co-processor enabled application 134.

Device source code 314 is pre-processed, compiled and linked by a device compiler and linker 324. This compile operation constitutes a first stage compile of device source code 314. Device compiler and linker 324 generates device virtual assembly 346, which is stored within a device code repository 350, residing with or within co-processor enabled application 134. A virtual instruction translator 334 may generate device machine code 324 from device virtual assembly 346. This compile operation constitutes a second stage compile of device source code 314. Virtual instruction translator 334 may generate more than one version of device machine code 344, based on the availability of known architecture definitions. For example, virtual instruction translator 334 may generate a first version of device machine code 344, which invokes native 64-bit arithmetic instructions (available in the first target architecture) and a second version of device machine code 344, which emulates 64-bit arithmetic functions on targets that do not include native 64-bit arithmetic instructions.

Architectural information 348 indicates the real architecture version used to generate device machine code 344. The real architecture version defines the features that are implemented in native instructions within a real execution target, such as the PPU 202. Architectural information 348 also indicates the virtual architecture version used to generate device virtual assembly 346. The virtual architecture version defines the features that are assumed to be either native or easily emulated and the features that are not practical to emulate. For example, atomic addition operations are not practical to emulate at the instruction level, although they may be avoided altogether at the algorithmic level in certain cases and, therefore, impact which functions may be compiled in the first compile stage.

In addition to the device machine code 344 and device virtual assembly 346, the device code repository also includes architecture information 348, which indicates which architectural features were assumed when device machine code 344 and device virtual assembly 346 where generated. Persons skilled in the art will recognize that the functions included within device machine code 344 and virtual assembly 346 reflect functions associated with the real architecture of PPU 202. The architecture information 348 provides compatibility information for device machine code 344 and compiler hints for a second stage compile operation, which may be performed by a device driver 103 at some time after the development of co-processor enabled application 134 has already been completed.

Device compiler and linker 324 is also configured to perform various optimization routines with program code 310. One such optimization routine involves selectively rematerializing sets of live-in variables, as described in greater detail below in conjunction with FIG. 4.

Live Analysis-Based Rematerialization

Figure 4:
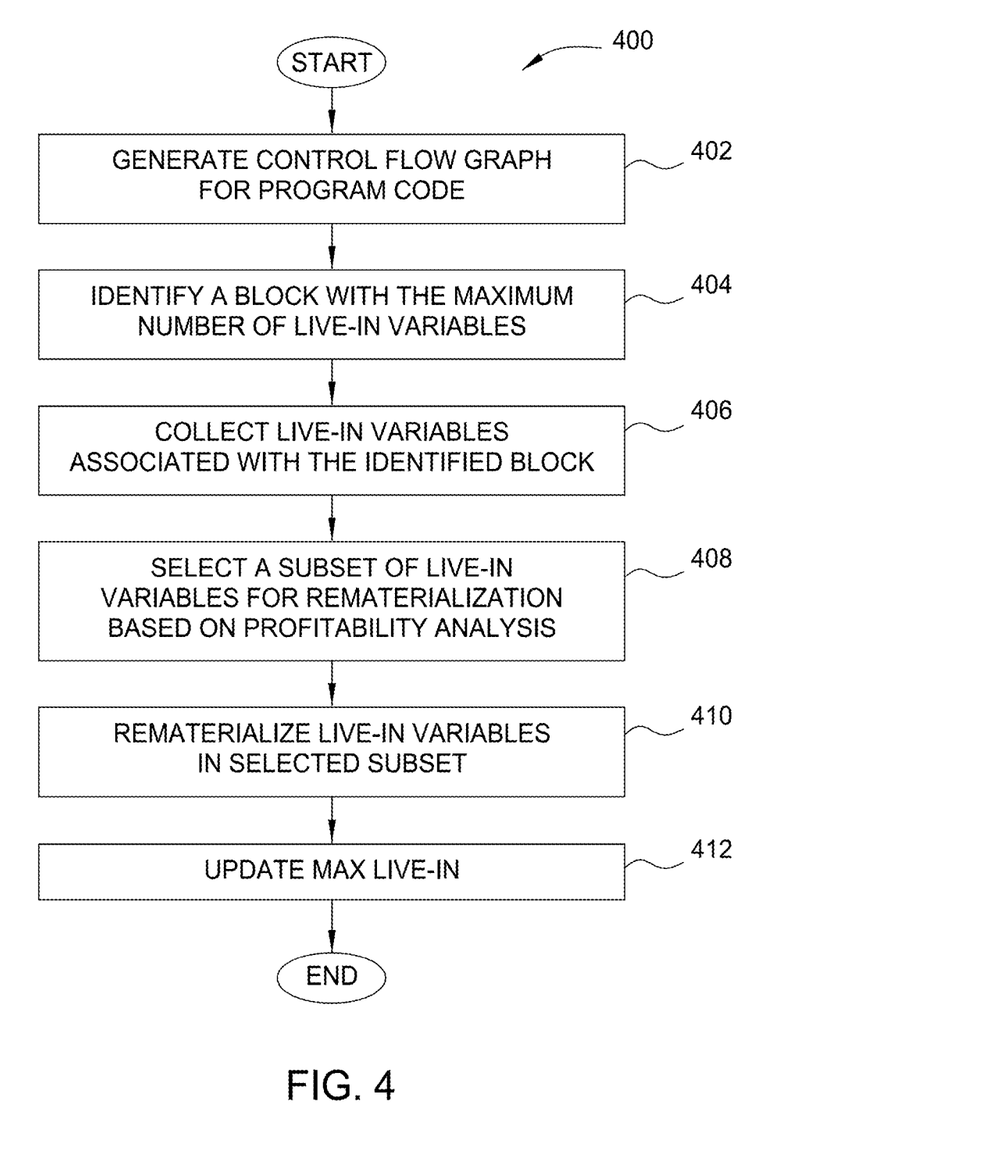
FIG. 4 is a flow diagram of method steps for performing live analysis-based rematerialization with a set of live-in variables, according to one embodiment of the invention.

FIG. 4 is a flow diagram of method steps for performing live analysis-based rematerialization with a set of live-in variables, according to one embodiment of the invention. Although the method steps are described in conjunction with the systems of FIGS. 1-2, persons skilled in the art will understand that any system configured to perform the method steps, in any order, is within the scope of the present invention. In one embodiment, device compiler and linker 324 shown in FIG. 3 may be configured to implement the method steps.

As shown, a method 400 begins at step 402, where device compiler and linker 324 generates a control flow graph for program code 310. The control flow graph generated by device compiler and linker 324 may be a conventional control graph generated using data flow analysis techniques and, as such, may include a collection of code blocks. At step 404, device compiler and linker 324 identifies a block in the control flow graph that includes the maximum number of live-in variables. In one embodiment, device compiler and linker 324 determines the number of live-in variables for each block in the control flow graph and then identifies the block having the greatest number of live-in variables. The maximum number of live-in variables is represented by a value referred to as "max live-in". Max live-in may indicate an amount of register pressure caused by executing co-processor enabled application 134. At step 406, device compiler and linker 324 collects live-in variables associated with the block identified at step 404.

At step 408, device compiler and linker 324 selects a subset of the live-in variables for rematerialization based on performing a profitability analysis with different subsets of live-in variables. Device compiler and linker 324 may perform the profitability analysis in order to determine the "profitability" of rematerializing a given subset of live-in variables. The "profitability" of a given subset of live-in variables may be a numerical value that reflects the number of live-in variables reduced by rematerializing the given subset. That value may additionally reflect the number of instructions pulled in for that rematerialization and/or the maximum number of registers allowed for each thread, as discussed in greater detail below in conjunction with FIG. 5.

At step 410, device compiler and linker 324 rematerializes the live-in variables in the given subset. Device compiler and linker 324 may implement any technically feasible rematerialization technique. In one embodiment, device compiler and linker 324 rematerializes a given subset of live-in variables by first removing computations involving those live-in variables from a block of the control flow graph. Device compiler and linker 324 may then modify a subsequent block of the control flow graph to re-compute the live-in variables associated with the subset within the subsequent block. In doing so, device compiler and linker 324 may modify program code 310 as needed. At step 412, device compiler and linker 324 updates max live-in by identifying the number of live-in variables for each block and identifying the block with the greatest number of live-in variables. The method 400 then ends.

Device compiler and linker 324 may perform steps 404, 406, 408, 410, and 412 iteratively until a specific goal is met. In one embodiment, device compiler and linker 324 performs those steps a fixed number of times, e.g. 5 times. In another embodiment, device compiler and linker 324 performs steps 404, 406, 408, 410, and 412 iteratively until max live-in decreases beneath a given threshold, indicating that register pressure has decreased sufficiently as a result of rematerialization.

Figure 5:
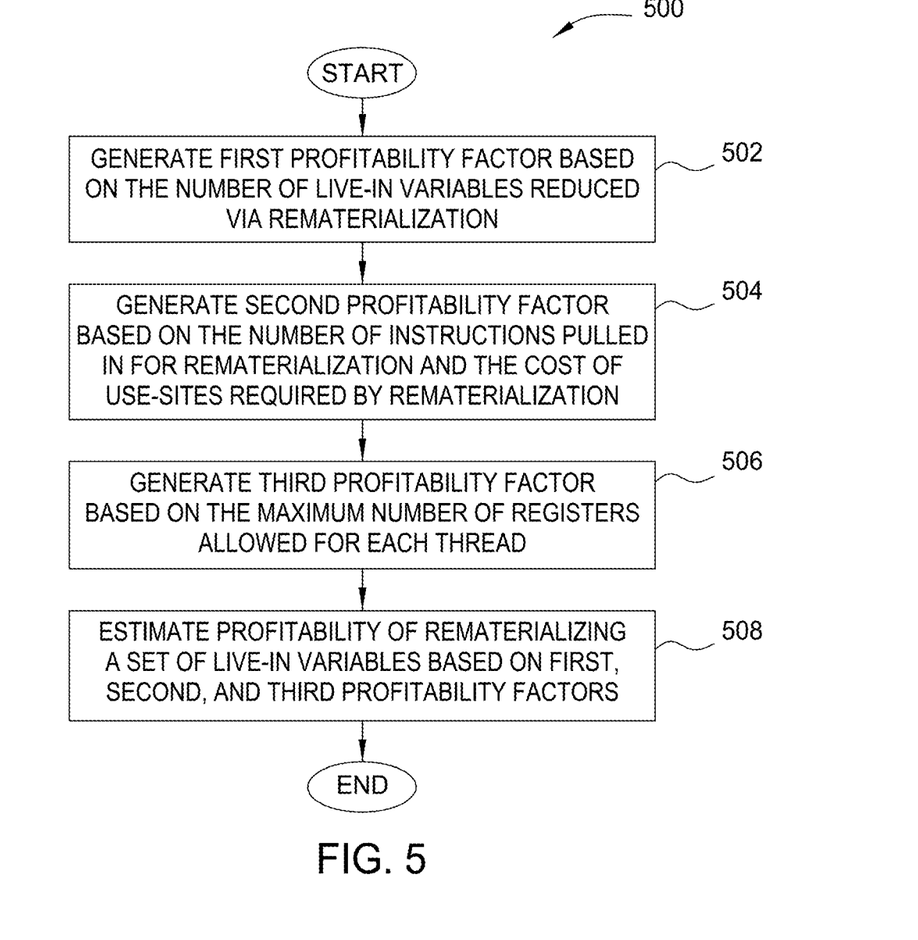
FIG. 5 is a flow diagram of method steps for performing a profitability analysis on a set of live-in variables, according to one embodiment of the invention.

FIG. 5 is a flow diagram of method steps for performing a profitability analysis on a set of live-in variables, according to one embodiment of the invention. Although the method steps are described in conjunction with the systems of FIGS. 1-2, persons skilled in the art will understand that any system configured to perform the method steps, in any order, is within the scope of the present invention. In one embodiment, device compiler and linker 324 shown in FIG. 3 may be configured to implement the method steps with a subset of live-in variables associated with the block identified in step 404 of the method 400.

As shown, a method 500 begins at step 502, where device compiler and linker 324 generates a first profitability factor for the subset of live-in variables based on the number of live-in variables reduced via rematerialization. For example, device compiler and linker 324 could determine that rematerialization reduces the number of live-in variables by two and increases that number by one, for a net loss of one live-in variable.

At step 504, device compiler and linker 324 generates a second profitability factor based on the number of instructions pulled in for rematerialization and the cost of the use-sites required by rematerialization. Since different live-in variables may be associated with instructions of differing complexity and/or use-sites having different costs, device compiler and linker 324 generates the second profitability factor in order to quantify such differences between different subsets of live-in variables.

At step 506, device compiler and linker 324 generates a third profitability factor based on the maximum number of registers allowed for each thread configured to execute co-processor enabled application 134. In doing so, device compiler and linker 324 may estimate the cost of a "spill" event that would occur when that maximum number of registers is exceeded. The cost could reflect, e.g., an increase in memory latency due to the spill event and/or decrease in program execution speed, among other things. At step 508, device compiler and linker 324 estimates the profitability of rematerializing the subset of live-in variables based on the first, second, and third profitability factors generated at steps 402, 404, and 406, respectively. In general, the "profitability" of rematerializing a given subset of live-in variables is a numerical value that reflects the potential benefit of rematerializing that subset of variables.

Device compiler and linker 324 is configured to perform the method 500 with multiple different subsets of the set of live-in variables associated with the block identified at step 404 of the method 400. In doing so, device compiler and linker 324 may estimate the profitability of rematerializing each possible subset of those live-in variables and then select the subset having the greatest profitability for rematerialization.

The methods 400 and 500 described above in conjunction with FIGS. 4 and 5, respectively, are illustrated in greater detail below by way of example in conjunction with FIG. 6.

Figure 6:
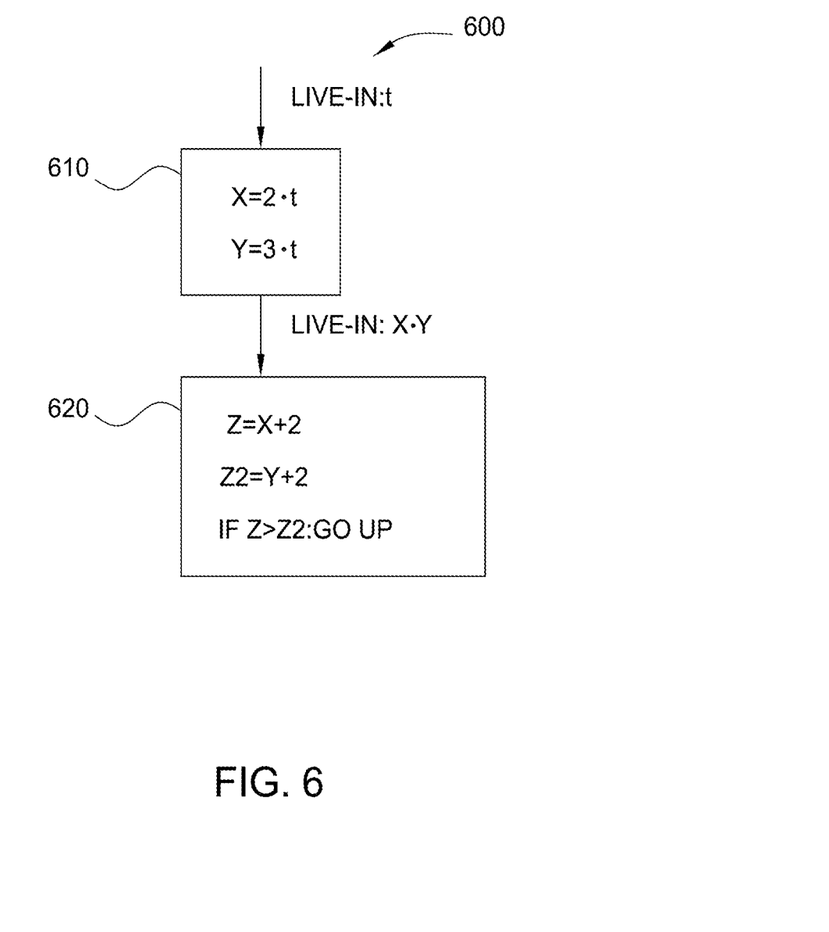
FIG. 6 sets forth an example control flow graph to illustrate the operation of a device compiler and linker, according to one embodiment of the present invention.

FIG. 6 sets forth an example control flow graph to illustrate the operation of a device compiler and linker, according to one embodiment of the present invention. Device compiler and linker 324 may generate control flow graph 600 based on program code 310 at step 402 of the method 400, as described above in conjunction with FIG. 4. As shown, control flow graph 600 includes blocks 610 and 620. Block 610 includes two expressions and receives one live-in variable "t" from a previous block (not shown). Block 620 includes three expressions and receives two live-in variables "x" and "y" from block 610. The expressions within those blocks are derived from program code 310. In the following example, device compiler and linker 324 performs the methods 400 and 500 described above in conjunction with FIGS. 4 and 5, respectively, in order to selectively rematerialize variables within control flow graph 600. In doing so, device compiler and linker 324 may reduce register pressure when a given PPU 202 executes code represented by control flow graph 600.

Once device compiler and linker 324 has generated control flow graph 600, device compiler and linker 324 identifies the block within control flow graph 600 with the maximum number of live in variables. Since block 610 receives one live-in variable and block 620 receives two live-in variables, device compiler and linker 324 identifies block 620 as having max live-in, similar to step 404 of the method 400. Device compiler and linker 324 then selects a subset of the live-in variables associated with block 620 based on a profitability analysis performed with each possible subset.

In this example, device compiler and linker 324 could perform the profitability analysis with subsets that include live-in variable "x," live-in variable "y," or live-variables "x" and "y." The profitability analysis outlined in conjunction with FIG. 5 would reveal that rematerializing just "x" or "y" independently would not reduce the number of live-in variables to block 620, because doing so would introduce "t" as a new live-in variable for a net loss of zero live-in variables. However, rematerializing both "x" and "y" together would decrease the number of live-in variables by two and increase the number of live-in variables by just one, for a net loss of one live in-variable. This net loss may be reflected in the first profitability factor generated by device compiler and linker 324 in step 502 of the method 500 for the subset including "x" and "y."

Device compiler and linker 324 is also configured to determine the number of instructions pulled in for rematerializing live-in variables in a given subset and the cost of use-sites required for rematerializing those live-in variables, similar to step 504 of the method 500. In this example, device compiler and linker 324 would analyze the definitions of live-in variables "x" and "y" as well as the type of memory accesses required by those definitions in order to determine the "overhead" involved with rematerializing those variables. In some situations, the overhead involved with rematerializing the live-in variables in a given subset may be prohibitive due to, e.g., the complexity of the instructions required to rematerialize certain live-in variables, or the use-site cost associated with rematerializing those variables. In general, the second profitability factor generated by device compiler and linker 324 at step 504 of the method 500 reflects that overhead.

For each subset of live-in variables discussed in this example, specifically the subsets that include "x", "y", or "x" and "y", device compiler and linker 324 generates the first and second profitability factors discussed above and in conjunction with steps 502 and 504, respectively, of the method 500. For each such subset, device compiler and linker 324 also generates the third profitability factor discussed in conjunction with step 506 of the method 500. Device compiler and linker 324 generates the third profitability factor for a given subset based on the maximum number of registers allowed for each thread configured to execute co-processor enabled application 134 and the cost of a "spill" event that could occur when that number of registers is exceeded. In such a situation, the live-in variables in the given subset could spill into system memory. Device compiler and linker 324 estimates the third profitability factor for the given subset based on the "cost" of that spill, e.g. the increase in memory latency and/or the decrease in program execution speed. Accordingly, the third profitability factor generated for a given subset of live-in variables represents a measure of "risk" associated with rematerializing the live-in variables in that subset.

Device compiler and linker 324 estimates the overall profitability of rematerializing the live-in variables in the different subsets discussed in this example based on the three profitability factors generated for each such subset, similar to step 508 of the method 500. Device compiler and linker 324 then rematerializes the live-in variables in the subset having the greatest profitability. In this example, the subset that includes both "x" and "y" has the greatest profitability, and so device compiler and linker rematerializes those variables within block 620 by modifying program code 310.

In sum, a device compiler and linker within a parallel processing unit (PPU) is configured to optimize program code of a co-processor enabled application by rematerializing a subset of live-in variables for a particular block in a control flow graph generated for that program code. The device compiler and linker identifies the block of the control flow graph that has the greatest number of live-in variables, then selects a subset of the live-in variables associated with the identified block for which rematerializing confers the greatest estimated profitability. The profitability of rematerializing a given subset of live-in variables is determined based on the number of live-in variables reduced, the cost of rematerialization, and the potential risk of rematerialization.

Advantageously, rematerializing certain subsets of live-in variables decreases register pressure, thereby reducing the likelihood of a spill event. Decreasing register pressure also allows a greater number of execution threads to be executed simultaneously with the PPU, thereby increasing the overall processing throughput of the PPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for optimizing program code that is capable of being compiled for execution on a parallel processing unit (PPU), the method comprising:
   generating a control flow graph for the program code;
   identifying a first block in the control flow graph with the greatest number of live-in variables compared to other blocks in the control flow graph;
   estimating a profitability value for each of different subsets of live-in variables associated with the first block by performing a profitability analysis on each of the different subsets;
   selecting a first subset of live-in variables based on the first subset of live-in variables having the greatest profitability value compared to the profitability values associated with the other different subsets of live-in variables; and
   optimizing the program code by rematerializing the first subset of live-in variables into a second block in the control flow graph that is subsequent to the first block in the control flow graph, wherein the optimized program code is to be executed on the PPU.

2. The computer-implemented method of claim 1, wherein the profitability analysis for a given subset of live-in variables is generated based on the number of live-in variables reduced by rematerializing the given subset of live-in variables into the second block in the control flow graph.

3. The computer-implemented method of claim 2, wherein the profitability analysis for the given subset of live-in variables is further generated based on the number of instructions pulled into the second block of the control flow graph when rematerializing the given subset of live-in variables into the second block.

4. The computer-implemented method of claim 3, wherein the profitability analysis for the given subset of live-in variables is further generated based on the number of use-sites associated with rematerializing the given subset of live-in variables into the second block of the control flow graph.

5. The computer-implemented method of claim 4, wherein the profitability analysis for the given subset of live-in variables is further generated based on at least one of the cost of transferring the given subset of live-in variables from register memory to system memory and the cost of accessing the given subset of live-in variables within system memory.

6. The computer-implemented method of claim 1, further comprising performing a data flow analysis on the program code to generate the control flow graph.

7. The computer-implemented method of claim 1, further comprising iteratively optimizing the program code and estimating an amount of register pressure caused by executing the optimized program code within the PPU until the amount of register pressure caused by executing the program code within the PPU falls below a threshold value.

8. The computer-implemented method of claim 1, further comprising:
determining that rematerializing the first set of live-in variables makes available a set of registers in register memory; and
allocating the set of registers to one or more threads configured to execute on the PPU.

9. A non-transitory computer-readable medium storing program instructions that, when executed by a processing unit, cause the processing unit to optimize program code that is capable of being compiled for execution on a parallel processing unit (PPU) by performing the steps of:
generating a control flow graph for the program code;
identifying a first block in the control flow graph with the greatest number of live-in variables compared to other blocks in the control flow graph;
estimating a profitability value for each of different subsets of live-in variables associated with the first block by performing a profitability analysis on each of the different subsets;
selecting a first subset of live-in variables based on the first subset of live-in variables having the greatest profitability value compared to the profitability values associated with the other different subsets of live-in variables; and
optimizing the program code by rematerializing the first subset of live-in variables into a second block in the control flow graph that is subsequent to the first block in the control flow graph, wherein the optimized program code is to be executed on the PPU.

10. The non-transitory computer-readable medium of claim 9, wherein the profitability analysis for a given subset of live-in variables is generated based on the number of live-in variables reduced by rematerializing the given subset of live-in variables into the second block in the control flow graph.

11. The non-transitory computer-readable medium of claim 10, wherein the profitability analysis for the given subset of live-in variables is further generated based on the number of instructions pulled into the second block of the control flow graph when rematerializing the given subset of live-in variables into the second block.

12. The non-transitory computer-readable medium of claim 11, wherein the profitability analysis for the given subset of live-in variables is further generated based on the number of use-sites associated with rematerializing the given subset of live-in variables into the second block of the control flow graph.

13. The non-transitory computer-readable medium of claim 12, wherein the profitability analysis for the given subset of live-in variables is further generated based on at least one of the cost of transferring the given subset of live-in variables from register memory to system memory and the cost of accessing the given subset of live-in variables within system memory.

14. The non-transitory computer-readable medium of claim 9, further comprising the step of performing a data flow analysis on the program code to generate the control flow graph.

15. The non-transitory computer-readable medium of claim 9, further comprising iteratively optimizing the program code and estimating an amount of register pressure caused by executing the optimized program code within the PPU until the amount of register pressure caused by executing the program code within the PPU falls below a threshold value.

16. The non-transitory computer-readable medium of claim 9, further comprising the steps of:
determining that rematerializing the first set of live-in variables makes available a set of registers in register memory; and
allocating the set of registers to one or more threads configured to execute on the PPU.

17. A computing device configured to optimize program code that is capable of being compiled for execution on a parallel processing unit (PPU), including:
a processing unit configured to:
generate a control flow graph for the program code;
identify a first block in the control flow graph with the greatest number of live-in variables compared to other blocks in the control flow graph;
estimate a profitability value for each of different subsets of live-in variables associated with the first block by performing a profitability analysis on each of the different subsets;
select a first subset of live-in variables based on the first subset of live-in variables having the greatest profitability value compared to the profitability values associated with the other different subsets of live-in variables; and
optimize the program code by rematerializing the first subset of live-in variables into a second block in the control flow graph that is subsequent to the first block in the control flow graph, wherein the optimized program code is to be executed on the PPU.

18. The computing device of claim 17, further including:
a memory unit coupled to the processing unit and storing program instructions that, when executed by the processing unit, cause the processing unit to:
generate the control flow graph;
identify the first block in the control flow graph;
select the first subset of live-in variables; and
optimize the program code by rematerializing the first subset of live-in variables into the second block in the control flow graph.

* * * * *